United States Patent
Togashi

(10) Patent No.: US 6,928,489 B2
(45) Date of Patent: Aug. 9, 2005

(54) CONTENTS TRANSMISSION/REPRODUCTION SYSTEM, CONTENTS TRANSMISSION APPARATUS, CONTENTS REPRODUCTION APPARATUS AND CONTENTS TRANSMISSION METHOD

(75) Inventor: Yuuichi Togashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 662 days.

(21) Appl. No.: 09/956,039

(22) Filed: Sep. 20, 2001

(65) Prior Publication Data

US 2002/0044606 A1 Apr. 18, 2002

(30) Foreign Application Priority Data

Sep. 29, 2000 (JP) ........................................ 2000-301065

(51) Int. Cl.[7] .............................................. G06F 13/00
(52) U.S. Cl. ........................ 709/247; 709/231; 725/90
(58) Field of Search ................................ 709/231, 247, 709/217, 219, 236, 246; 725/90, 115, 134

(56) References Cited

U.S. PATENT DOCUMENTS 6,128,021 A * 10/2000 van der Meulen et al. . 345/428
6,510,177 B1 * 1/2003 De Bonet et al. ........ 375/240.16
6,567,985 B1 * 5/2003 Ishii ........................... 725/115
6,600,786 B1 * 7/2003 Prakash et al. ......... 375/240.25
6,658,199 B1 * 12/2003 Hallberg ....................... 386/68
6,735,740 B2 * 5/2004 Sakai et al. .................. 715/526
2002/0057902 A1 * 5/2002 Song et al. .................. 386/111

* cited by examiner

*Primary Examiner*—Viet D. Vu
(74) *Attorney, Agent, or Firm*—Finnegan, Henderson, Farabow, Garrett & Dunner, L.L.P.

(57) ABSTRACT

A moving image (stream data) is transmitted/reproduced between a transmission side and a receiving side. At the receiving side, an image group configuring a moving image is compressed in accordance with a predetermined compression scheme, and the compressed image group is divided into a first image group and a second image group. Then, the second image group is stored in a removably mounted storage means, and the first image group is transmitted to the receiving side via a communication line in real time. On the other hand, at the receiving side, the first image group is received and displayed in real time via the communication line. Further, a storage means having the second image group stored therein is acquired via a distribution system, thereby reproducing an image group that configures a moving image from the received first image group and the second image group read out from the storage means.

12 Claims, 5 Drawing Sheets

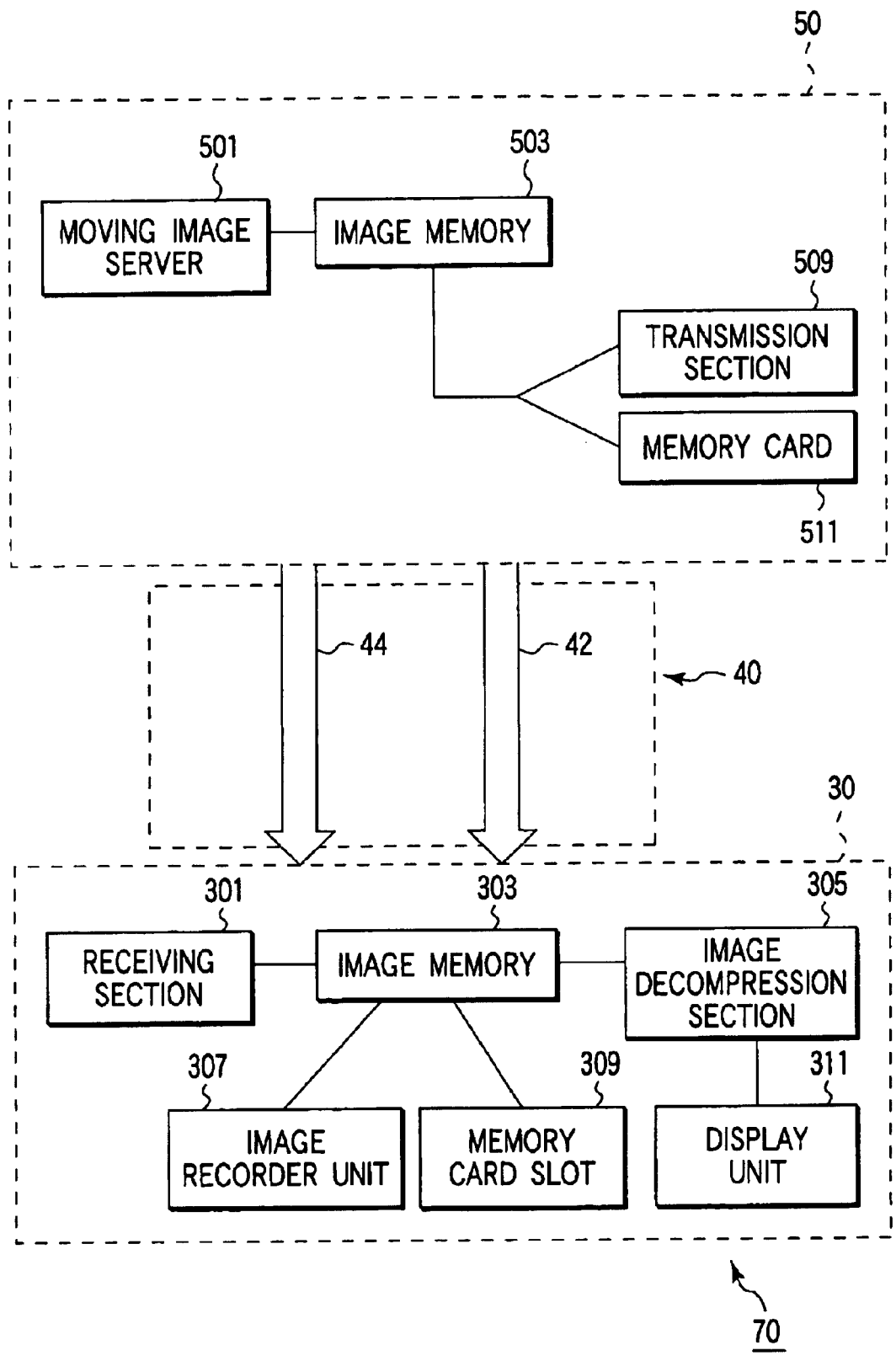
F I G. 2

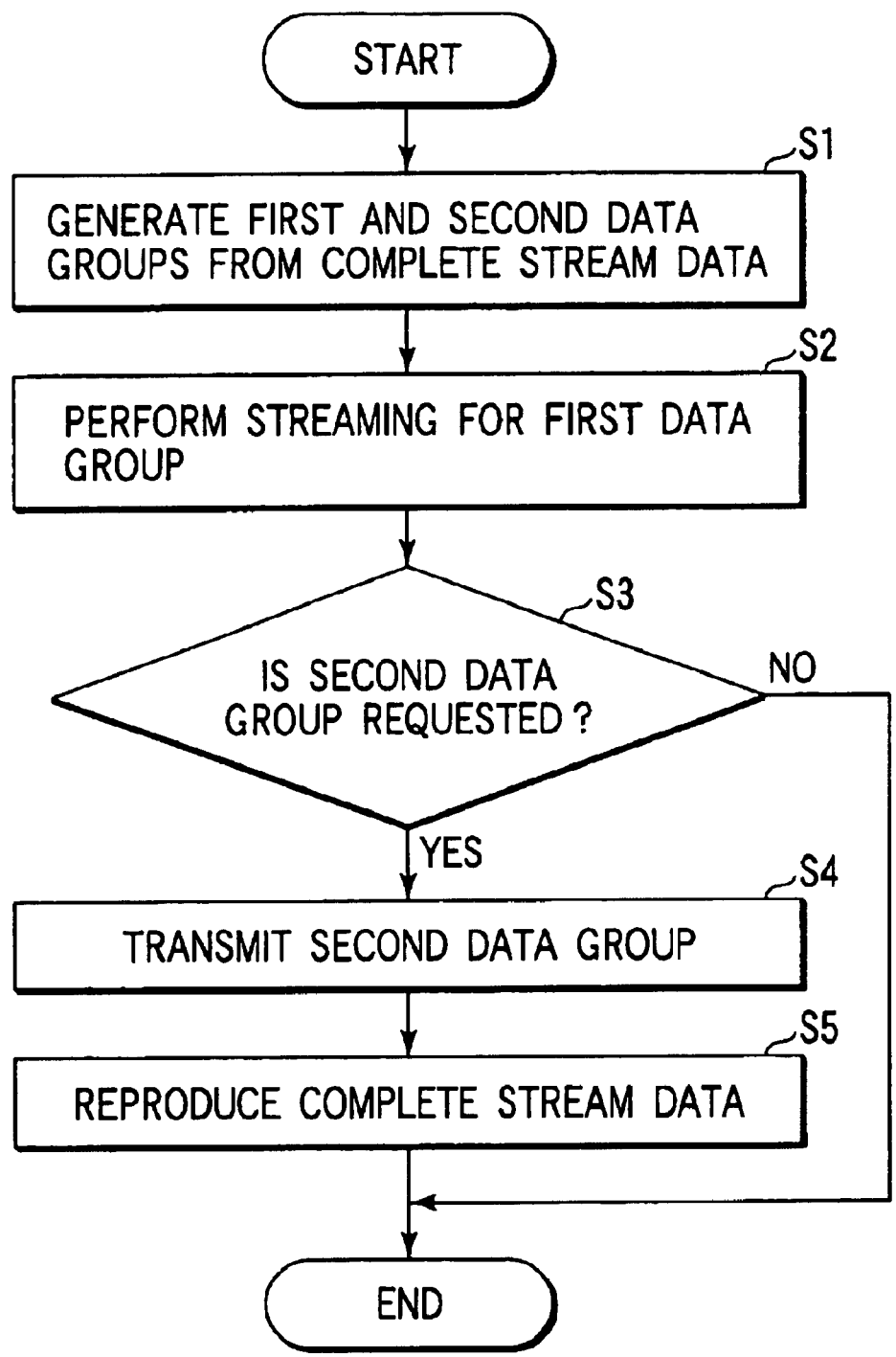
F I G. 3

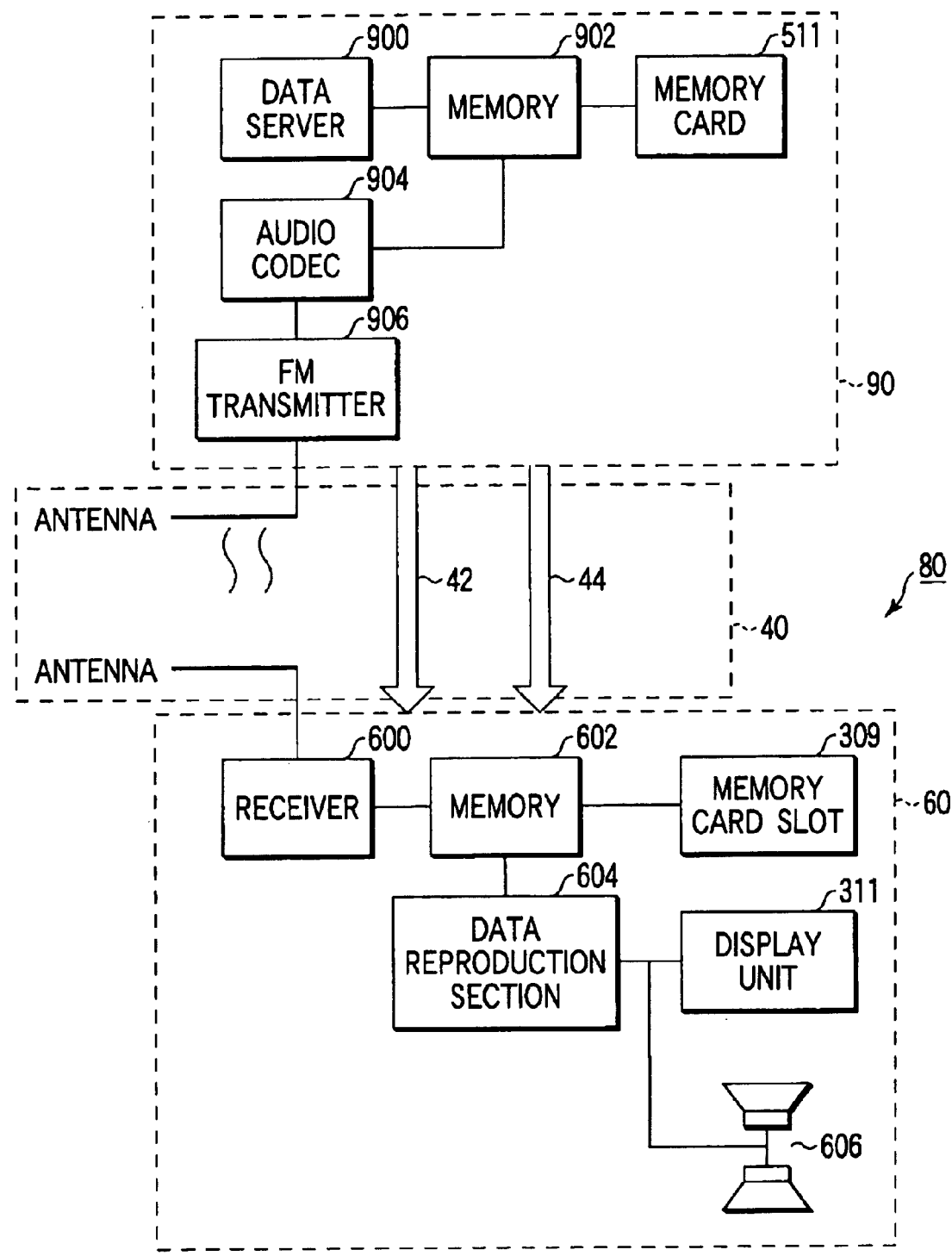
F I G. 4

CONTENTS TRANSMISSION/REPRODUCTION SYSTEM, CONTENTS TRANSMISSION APPARATUS, CONTENTS REPRODUCTION APPARATUS AND CONTENTS TRANSMISSION METHOD

CROSS-REFERENCE TO RELATED APPLICATIONS

This application is based upon and claims the benefit of priority from the prior Japanese Patent Application No. 2000-301065, filed Sep. 29, 2000, the entire contents of which are incorporated herein by reference.

BACKGROUND OF THE INVENTION

1. Field of the Invention

The present invention relates to a contents transmission apparatus, a contents reproduction apparatus, a contents transmission/reproduction system, and contents transmission method.

2. Description of the Related Art

Conventionally, it has been well known that systems each consisting of a video signal transmitter and video signal receiver or a video signal image recorder acquire and transmit a moving image that has already existed, and displays/records the image at a receiving side. Any of these systems FM employs a system that modulates a vide signal at the transmission side, transmits the signal to a receiver through an antenna; combines the moving image received by the antenna and converts the combined image into a video signal at the receiving side; and displays the video image at a receiving display device. In addition, a video signal image recorder is configured to exchange and display moving images recorded in a video tape or the like.

That is, in any cases, transmission of images between a transmission side (acquisition side) and a receiving side (display side) is executed based on an analog signal.

However, such analog signal is often degraded in the middle of transmission. In particular, in the case of a long transmission distance or in the case where transmission is carried out over plural times, there is a problem that an image quality of a transmission destination is degraded.

The present invention has been made in view of the circumstance. It is an object of the present invention to provide a contents transmission apparatus, a contents reproduction apparatus, a contents transmission/reproduction system, and a contents transmission method free of degradation of a signal in transmission from a transmission side to a receiving side, and in particular, free of degradation of an image quality or the like at a transmission destination even in the case of a long transmission distance or in the case where transmission is carried out over plural times.

BRIEF SUMMARY OF THE INVENTION

According to a first aspect of the present invention, there is provided a contents transmission/reproduction system comprises a contents transmission apparatus; and a contents reproduction apparatus for receiving and reproducing stream data transmitted from the contents transmission apparatus, the contents transmission apparatus including: means for dividing stream data into a first data group and a second data group; transmission means for transmitting the first data group to the contents reproduction apparatus via a communication line; and means for storing the second data group in a removable storage medium, the contents reproduction apparatus including: receiving means for receiving the first data group via the communication line; readout means for reading out the second data group from the storage medium; and reproduction means for reproducing the stream data from the received first data group and second data group read out from the storage medium.

According to a second aspect of the present invention, there is provided a contents transmission apparatus comprises: dividing means for compressing a data group that configures stream data in a predetermined compression scheme and for dividing the compressed data group into a first data group and a second data group; means for providing at least one of the first data group and second data group with reproduction information for reproducing the stream data by combining with another; transmission means for transmitting the first data group to a reproduction apparatus via a communication line; and means for storing the second data group in a removable storage medium.

According to a third aspect of the present invention, there is provided a contents reproduction apparatus comprises: receiving means for receiving a first data group that consists of a portion of stream data from a contents transmission apparatus via a communication line; means for acquiring a second data group that includes of the residual portion of the stream data via a communication line from the contents transmission apparatus or a removable recording medium having the second data group recorded therein; and a reproduction means for reproducing the stream data from the first data group and the second data group.

According to a fourth aspect of the present invention, there is provided a method for transmitting/reproducing stream data between a customer side and a contents provider side comprises: at the contents provider side, dividing the stream data into a first data group and a second data group; storing the second data group in a removable storage medium; transmitting the first data group to the customer side via a communication line; and at the customer side, reproducing the stream data from the first data group received via the communication line and the second data group read out from the storage medium.

According to a fifth aspect of the present invention, there is provided a content transmission/reproduction system comprises: a contents transmission apparatus; and a contents reproduction apparatus for receiving and reproducing voice data and image data transmitted from the contents transmission apparatus, the contents transmission apparatus including: transmission means for transmitting the voice data and the image data each to the contents reproduction apparatus at a different timing via a communication line, the contents reproduction apparatus including: receiving means for receiving the voice data and the image data via the communication line; and reproduction means for reproducing the received voice data and image data in synchronism with each other.

With such a configuration, there can be provided a contents transmission apparatus, a contents reproduction apparatus, a contents transmission/reproduction system, and a contents transmission method free of a degradation of a signal in transmission from a transmission side to a receiving side, and in particular, being free of degradation of a image quality or the like of a transmission destination even in the case of a long transmission distance or in the case where transmission is carried out over plural times.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block configuration showing a contents transmission/reproduction system 50 according to a second embodiment;

FIG. 3 is a flow chart illustrating a transmission/reproduction operation of contents achieved by this system;

FIG. 4 is a contents transmission/reproduction system 80 according to the present embodiment;

DETAILED DESCRIPTION OF THE INVENTION

Figure 1:
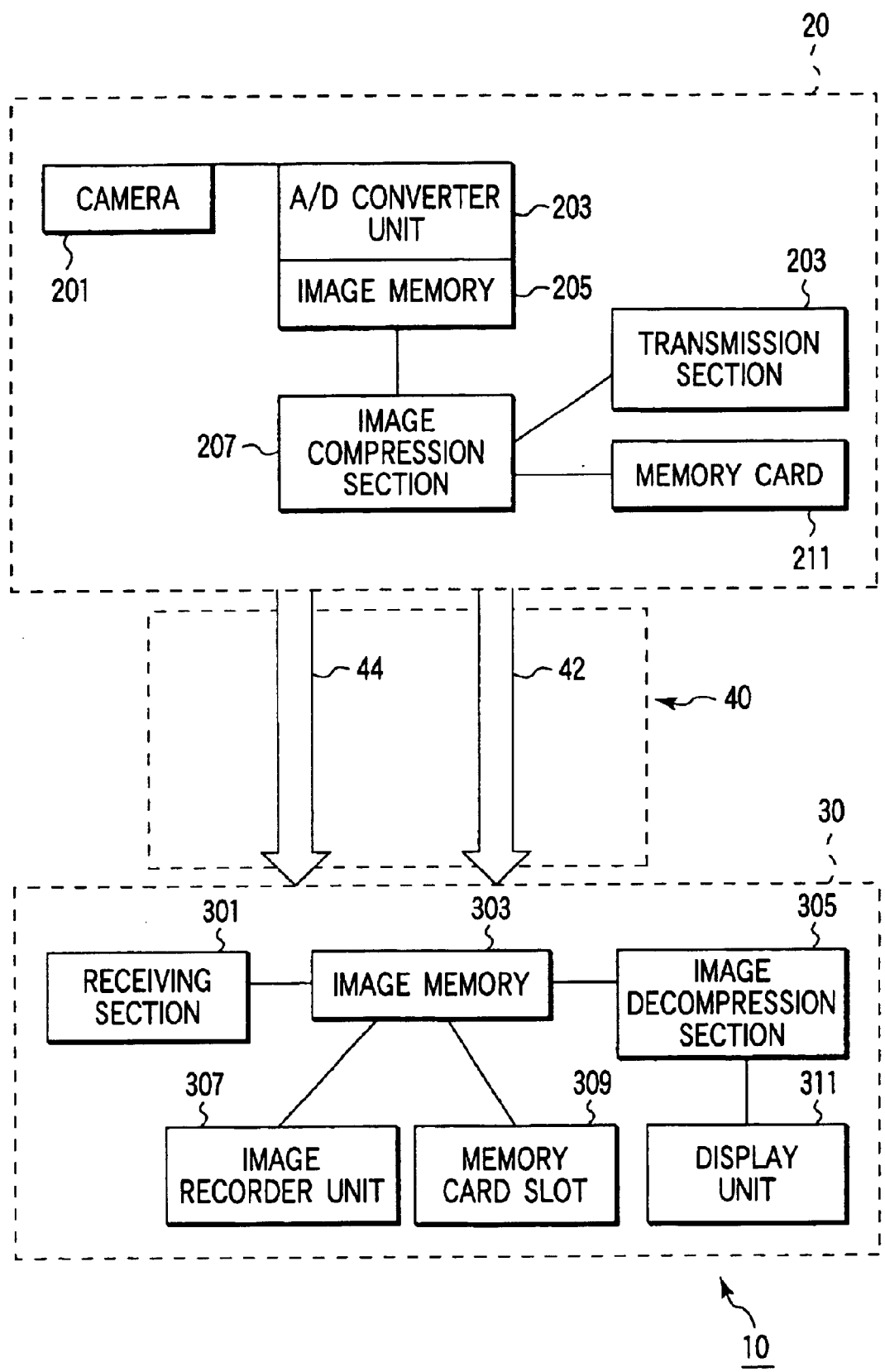
FIG. 1 is a block configuration showing a contents transmission/reproduction system 10 according to a first embodiment.

Hereinafter, preferred embodiments of the present invention will be described with reference to the accompanying drawings. In the following description, like constituent elements each having the substantially same functions and configuration are designated by like reference numerals. A duplicate description will be given only when necessary.

One of the important points of the contents transmission/reproduction system according to the present embodiment lies in an idea for dividing stream data that exists at the contents provider side into a plurality of data groups, i.e., a first data group and the residual second data group according to a transmission capacity of a communication line, transmitting these divided data groups each to a contents demander side at a different timing, and obtaining synchronization to reproducing the transmitted data groups at the demander side. According to this system, for example, after streaming a first data group, a customer additionally acquires a second data group as required, making it possible to reproduce complete stream data at the customer's reproduction apparatus.

Now, three embodiments of this system each will be described here.

<First Embodiment>

According to a first embodiment, a moving image acquired by a TV camera of a contents transmission apparatus is divided into a first image group and a second image group, and each of the image groups is displayed to be separately transmitted to the contents reproduction apparatus by utilizing a removable storage medium and a communication network.

FIG. 1 shows a block configuration of a contents transmission/reproduction system 10 according to the first embodiment. This moving image acquisition system 10 is a system that consists of a contents transmission apparatus 20, a contents reproduction apparatus 30, and an image data transmission means 40. Hereinafter, each of the constituent elements will be described.

(Contents Transmission Apparatus)

A contents transmission apparatus 20 comprises a camera 201, an A/D converter unit 203, an image memory 205, an image compression section 207, a transmission section 209, and a memory card 211.

A moving image camera 201 is an acquisition means such as a video camera that enables moving image acquisition.

The A/D converter unit 203 converts an image signal inputted from the moving image camera 201 into digital image data.

The image memory 205 is a storage means that temporarily stores digital image data acquired by the A/D converter unit 203.

The image compression section 207 compresses digital image data recorded in the image memory 205, and divides the compressed data into a first image group and a second image group. The first image group is an image group to be transmitted to the contents reproduction apparatus 30 in real time from the contents transmission apparatus 20 via a first data transmission means 42. The contents of this first image group are determined depending on the transmission capacity of the first transmission means 42. For example, there is assumed a configuration in which the first image group is defined as an image group of a maximum data amount in a range such that the display at the contents reproduction apparatus 30 appears in real time. In addition, the second image group is an image group that corresponds to the residual image data when the first image group is excluded from the compressed digital image data. This second image group is transmitted to the contents reproduction apparatus 30 with a time difference from transmission of the first image group via a second data transmission means 44 described later from the contents transmission apparatus 20.

In addition, the image compression section 207 provides ID information for associating first and second image groups with each other to such each image group when the first image group and second image group is generated from digital image data after compressed. With such a configuration, even if the first image groups and second image group are transmitted to the contents reproduction apparatus 30 with a time difference, the corresponding image group can be easily judged. Further, the image compression section 207 assigns a time-based code (synchronizing signal) to each image that configures each image group. This is because synchronization is obtained when an original moving image is reproduced in the contents reproduction apparatus 30. It is preferable that ID information or a synchronizing signal is decoded in order to easily make a copy from the viewpoint of security.

An operation of this image compression section 207 will be described later in detail by way of example when a compression scheme is defined as MPEG.

The transmission section 209 transmits the first image group sampled by the image compression section 207 to a receiving section 301 of the contents reproduction apparatus 30 via the first transmission means 42 in real time.

The memory card 211 is a recording means for recording image data, and includes, for example, a DVD, a smart medium, a CD-ROM, and MO or the like.

(Image Data Transmission Means)

An image data transmission means 40 is composed of a first transmission means 42 and a second transmission means 44.

The first transmission means 42 is an electric communication network utilizing a wired or wireless electromagnetic means. Specifically, Internet or the like is exemplified. A first image group is transmitted from a contents transmission apparatus 20 to a contents reproduction apparatus 30 via this first transmission means 42 in real time.

A second transmission means 44 is a path that transmits a second image group, and is, for example, a transport utilizing the above described electric communication network, overland route or canal, or alternatively, airway (hereinafter, referred to as a "delivery system"). That is, in the case where the second image group is temporarily recorded in a memory card, and is transmitted from the contents transmission apparatus 20 to the contents reproduction apparatus 30 by means of the memory card, the second transmission means 44 is a transmission means using such a delivery system. In addition, for example, after the first image group has been transmitted, in the case where a second image group is transmitted by means of the first transmission means 42, the second transmission means 44 and the first transmission means 42 are identical to each other. Of course, an electric communication network different from the first transmission means 42 may be employed.

The first embodiment and the second and third embodiments described later each assume an example when a second image group is transmitted from the contents transmission apparatus 20 to the contents transmission apparatus 30 by means of the memory card. Therefore, the second transmission means 44 is defined as a delivery system.

(Contents Reproduction Apparatus)

A contents reproduction apparatus 30 comprises a receiving section 301, an image memory 303, an image decompression section 305, an image recorder unit 307, a memory card slot 309, and a display unit 311.

The receiving section 301 is a receiving means that receives a first image group transmitted from a contents transmission apparatus 42 via a first transmission means 42 in real time.

The image memory 303 is a storage means that temporarily stores a first image received by the receiving section 301.

The image decompression section 305 reads out a first image group from the image memory 303, and applies decompression processing. In addition, the image decompression section 305 reads out ID information of a second image group additionally transmitted via a second transmission means 44, and authenticates whether or not the read out ID information is identical to that of the stored first image group. In the case where the identical ID information is authenticated, the image decompression section 305 obtains synchronization based on a time-based code assigned to each image, and generates an original image.

The image recorder unit 307 is a nonvolatile storage means that stores the received first image group.

The memory card slot 309 is a connector for mounting a memory card thereon. In the present embodiment, a memory card 211 having the memory card slot 309 transmitted via the second transmission means 44 is mounted, whereby a second image group is provided to the contents reproduction apparatus 30.

The display unit 311 is a display means such as CRT.

Now, a transmission/reproduction of contents achieved by the contents transmission/reproduction system 10 will be described with reference to FIG. 3.

FIG. 3 is a flow chart illustrating a contents transmission and reproduction operation achieved by the system according to the present invention.

First, an image signal acquired by means of a camera 201 of a contents transmission apparatus 20 provided at a base station is converted into digital image data by means of an A/D converter unit 203, and the converted signal is stored in an image memory 205 (refer to FIG. 1).

An image compression section 207 generates a first image group (first data group) and a second image group (second data group) caused by an MPEG image, from digital image data stored in the image memory 205. That is, the image compression section 207 generates a first image group that consists of I image and P image and a second image group that consists of B image. A configuration of the first image group depends on a transmission capacity of the first transmission means. For example, in the case of a large transmission capacity, there may be employed a configuration in which the first image group includes part of the B image. In addition, in the case of a small amount of transmission, there may be employed a configuration in which only I image is defined as a first image group, and the residual P image and B image are defined as a second image group. The same ID information is provided to the first image group and the second image group in order to obtain coincidence in the contents reproduction apparatus 30. In addition, a time-based code is assigned to each image of each image group in order to obtain synchronization when reproduction is carried out in the contents reproduction apparatus 30. Then, the first image group is outputted to a transmission section 209. In addition, the second image group is temporarily stored in a memory card 211. At this time, it is preferable to employ a configuration in which a compression or decompression algorithm, or alternatively, a decompression program corresponding to the second image group is stored at the same time. With the configuration, image decompression processing can be executed without any special program provided at the image receiving side.

The first image group is transmitted by means of the transmission section 209 in real time to the contents reproduction apparatus 30 at the audience side via a first transmission means 42 that is an electric communication network. In the contents reproduction apparatus 30, the first image group is received by the receiving section 301, and is temporarily stored in the image memory 303. Then, the first image group is subjected to decompression processing by means of an image decompression section 305 at the same time, and a moving image is displayed at a display unit 311 in real time (step S2 in FIG. 3). Therefore, the first image group is provided as a so called live picture to an audience.

The thus streamed first image group is basically far from a high resolution image because of its transmission capacity. It is possible for the audience to judge whether or not an image with its high resolution is further required depending on this live picture provided free or at a low price (step S3 in FIG. 3).

In the case where an audience further desires an image with its high resolution, for example, the audience notifies a provider to makes a request for an additional second image group through a communication line, for example, and makes payment, thereby making it possible to acquire the second image group (step S4 in FIG. 3). This second image group is recorded in the memory card 211, and is delivered via the second transmission means 44 by means of a delivery system. Then, the audience mounts this memory card 211 on the memory card slot 309, and synchronizes the first image group and second image group that have been already stored in the contents reproduction apparatus 30 with each other, thereby making it possible to reproduce a moving image with its high resolution (step S5 in FIG. 3).

A technique for acquiring the second image group may be transmission via a communication line through which the first image group has been transmitted, for example, as well as the above delivery system. In addition, in the case where a plurality of communication lines can be used, there may be employed a configuration in which the second image groups is transmitted via a communication line that differs from the line through which the first image group has been transmitted. That is, this system transmits the first image group in real time, whereby general information is provided to an audience speedily, and a second image group is provided only when the audience requires it. Therefore, any transmission means may be employed as long as the above object can be achieved.

<Second Embodiment>

In a second embodiment, unlike the first embodiment, a digital image group obtained as a moving image stored in a server is divided into a first image group and a second image group, and the image groups each are transmitted to and displayed on a contents reproduction apparatus separately by utilizing a card and a communication network. The moving image stored in the server may be a live picture stored in real time or may be a moving image acquired in advance.

FIG. 2 shows a block diagram of a contents transmission/reproduction system according to the second embodiment. This system 70 is a system that consists of a contents transmission apparatus 50, a contents reproduction apparatus 30, and an image data transmission means 40. Only constituent elements different from those according to the first embodiment will be described here.

(Contents Transmission Apparatus>

The contents transmission apparatus 50 comprises a moving image server 501, an image memory 503, a transmission section 509, and a memory card 511.

The moving image server 501 is a server that stores an MPEG image concerning a moving image, and divides the MPEG image into a first image group and a second image group.

The image memory 503 is a storage means that temporarily stores digital image data inputted from the moving image server 501.

The transmission section 509 transmits the first image group stored in the image memory 503 to the receiving section 301 of the contents reproduction apparatus 30 via a first transmission means 42.

The memory card 511 has the same configuration as the memory card 211.

Now, transmission/display of a moving image achieved by the contents transmission/reproduction system 70 will be described with reference to FIGS. 2 and 3.

In FIG. 2, the MPEG image stored in the moving image server 501 is outputted into the image memory 503 after divided into the first image group and second image group (step S1 in FIG. 3).

A configuration of the first image group is similar to that according to the first embodiment in that the configuration depends on the transmission capacity of the first transmission means, ID information or time-based code is assigned to each image, and a compression or decompression algorithm, or alternatively, a decompression program are stored together with the second image group at the same time.

The first image group is transmitted by means of the transmission section 509 in real time to the audience's contents reproduction apparatus 30 via the first transmission means 42 that is an electric communication network. In the contents reproduction apparatus 30, the first image group is received by the receiving section 301, and is temporarily stored in the image memory 303. At the same time, the first image group is subjected to decompression processing by means of the image decompression section 305, and a moving image is displayed at the display unit 311 in real time (step S2 in FIG. 3). Therefore, the first image group is provided to an audience as a so called live picture.

The thus streamed first image group is basically far from a high resolution image because of its transmission capacity. It is possible for an audience to judge whether or not a high resolution image is further required, by the stream data caused by the first image group (step S3 in FIG. 3).

In the case where an audience further desires a high resolution image, the audience notifies a provider to make a request for an additional second image group through a communication line, for example, and make a payment, thereby making it possible to acquire the second image group (step S4 in FIG. 3). This second image group is recorded in the memory card 511, and is delivered via the second transmission means 44 by means of a delivery system. The audience mounts this memory card 511 on the memory card slot 309, and synchronizes the first image group and second image group that have been already stored in the contents reproduction apparatus 30, thereby making it possible to reproduce a high resolution moving image (step S5 in FIG. 3). The memory card 511 having the second image group recorded in advance is delivered in advance, thereby making it possible to achieve high-resolution moving image reproduction at the same time as transmission of the first image group.

<Third Embodiment>

The above embodiments each have described an example when an MPEG based moving image is transmitted from a transmitting side to a receiving side by a first transmission means and a second transmission means. In contrast, a third embodiment describes an example when an image and a voice are transmitted separately. That is, at the contents provider side, a voice is transmitted wirelessly, and a radio-based reception is carried out at the demander side, whereby only the voice is reproduced in real time. In addition, image data is transmitted offline such as a communication network or a delivery system with a time difference from voice transmission, a moving image with voice is generated and display/stored at the receiving side.

FIG. 4 shows a contents transmission/reproduction system 80 according to the present embodiment. This system 80 is a system that consists of a contents transmission apparatus 90, a contents reproduction apparatus 60, and an image transmission means 40. Only constituent elements different from those of the first and second embodiments will be described here.

(Contents Transmission Apparatus)

The contents transmission apparatus 90 comprises a data server 900, a memory 902, an audio CODEC section 904, a FM transmitter 906, and a memory card 511.

The data server 900 is a server that stores stream data, and that divides the stream data into an MPEG image group and an audio data group compressed by MP3 or the like. At this time, an ID for associating a time-based code for obtaining synchronization with data of these groups is assigned to each data group.

The memory 902 is a storage means that temporarily stores the MPEG image group and audio data group inputted from the server 900.

The audio CODEC section 904 D/A applies decompression processing to the audio data stored in the memory 902, and then, D/A converts the decompressed audio data, thereby generating an analog audio signal. This audio signal is outputted to the FM transmitter 906 according to mode setting.

The FM transmitter 906 frequency-modulates the audio signal inputted from the audio CODEC section 904, and transmits the modulated audio signal to a contents reproduction apparatus 60 via an antenna.

(Contents Reproduction Apparatus)

The contents reproduction apparatus 60 comprises a receiver 600, a memory 602, a data reproduction section 604, a speaker 606, a memory card slot 309, and a display unit 311.

The receiver 600 comprises a radio circuit that receives an FM wave transmitted from a contents transmission apparatus 90; and a CODEC circuit that converts an analog signal based on the received FM wave into a digital signal.

The memory 602 is a storage means that temporarily stores a digital voice signal from the receiver 600.

A data reproduction section 604 reads out image data from a card mounted on a memory card slot 309, and applies decompression processing to the read data. In addition, the data reproduction section 604 authenticates whether or not ID information on image groups is the same as ID information on digital voice data. In the case where the same ID information is authenticated, the data reproduction section 604 obtains synchronization based on a time-based code assigned to an image, and generates original stream data.

Now, transmission/display of a moving image achieved by a contents transmission/reproduction system 80 will be described with reference to FIGS. 3 and 4.

In FIG. 4, the stream data stored in the server 900 is divided into an audio data group (a first data group) and an MPEG image group (a second data group), and is outputted to the memory 902 (step S1 in FIG. 3).

A compression or decompression algorithm, or alternatively, a decompression program are stored together with the MPEG image group at the same time.

The audio data group is outputted to the FM transmitter 906 after being converted into an analog/audio signal by means of the audio CODEC section 904. The FM transmitter 906 frequency-modulates an audio signal inputted from the audio CODEC section 904, and transmits the modulated audio signal to a contents reproduction apparatus 60 via an antenna. In the contents reproduction apparatus 60, an audio signal is received as an FM wave by means of a receiver 600, and is converted into a digital data. Then, the converted digital data is temporarily stored in the memory 602. At the same time, the audio signal is outputted as a voice from a speaker 606 in real time (step S2 in FIG. 3).

The thus provided voice in real time is provided to an audience free, for example. It is possible for the audience to judge whether or not a high resolution image is further required by this voice (step S3 in FIG. 3).

In the case where an audience desires an image that corresponds to a voice, the audience notifies a provider to make a request for an additional second image group through a communication line, for example, and makes a payment, thereby making it possible to acquire such image group (step S4 in FIG. 3). This image group is recorded in the memory card 511, and is delivered via the second transmission means 44 by means of a delivery system. Then, the audience mounts this memory card 511 on the memory card slot 309, and synchronizes digital data concerning a voice that has been already stored in the contents reproduction apparatus 30 with such image group, thereby making it possible to reproduce a moving image with voice (step S5 in FIG. 3).

For transmission of an image group, as described in the first and second embodiments, there may be employed a configuration in which such image group is transmitted after being divided into the first image group and the second image group.

With the above described configuration, an audience acquires a first image group in real time in data amount according to the transmission capacity of a transmission means with respect to an image with its high real time properties, and can listen it to a live picture or the like. Therefore, speedy image acquisition is possible. In addition, by means of a first image group provided free or at a low price, it is possible to judge whether or not a high resolution image or the like is further required. Hence, the audience can freely select a required image, making it possible to ensure more economical image acquisition.

In the case of requiring a high resolution image or the like, the audience notifies the fact to an image provider side, thereby making it possible to acquire a second image group offline or the like. The audience ensures that the second image group and the first image group coincide or image and voice coincide, thereby making it possible to acquire a moving image with its high precision. Therefore, even in the case of a long transmission distance or in the case where transmission is carried out over plural times, it is possible to acquire a moving image free of degradation of an image quality.

Although the present invention has been described above by way of embodiments, various modifications and alterations can occur to one skilled in the art with the scope of idea of the present invention, and it is construed that these modifications and alterations pertain to the scope of the present invention. For example, as shown below, various modifications can occur without departing from the spirit of the invention.

In the first and second embodiments, a compression scheme is defined as MPEG, where a first image group is composed of I image and B image, and a second image group is composed of P image, for example. In contrast, in images of a plurality of image groups each configuring moving images, there may be employed a configuration in which image information having information on a predetermined number of pixels decimated therefrom is defined as a first image group, and the residual image information is defined as a second image group.

Figure 5:
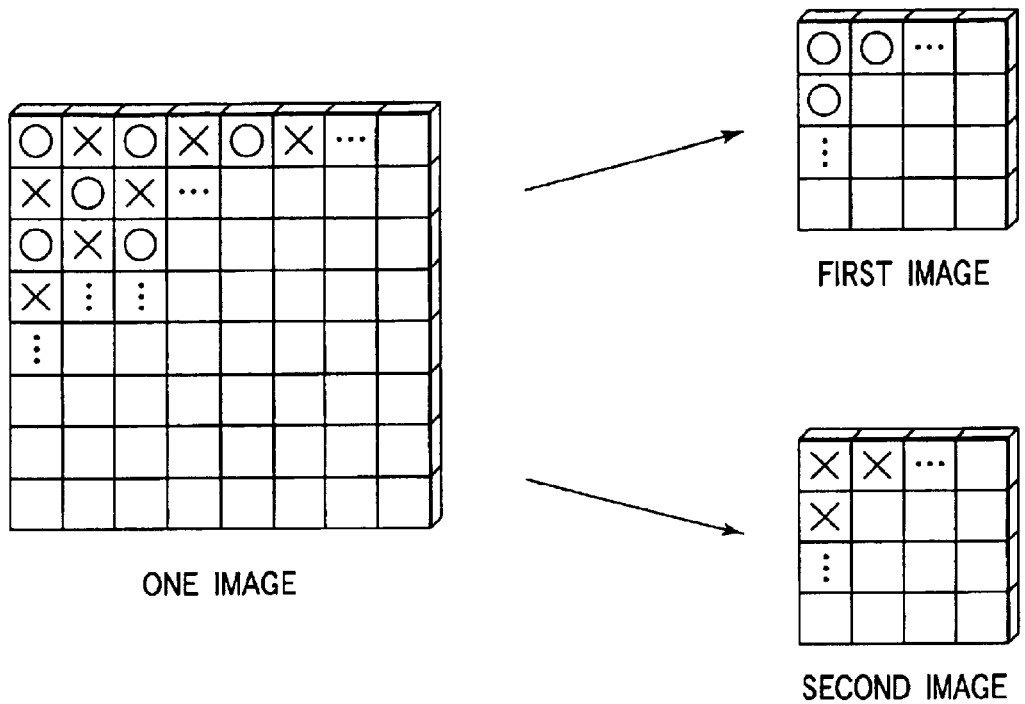
FIG. 5 is a view illustrating a modified example of the first and second embodiment.

FIG. 5 is a view illustrating a modified example of the first and second embodiments.

As shown in FIG. 5, for example, there may be employed a configuration in which pixels are alternately distributed, thereby producing a first image and a second image, and a first image group is generated from the first image concerning each full image, and a second image group is generated from the second image concerning each full image. Otherwise, for example, there can be employed a configuration or the like in which scanning lines are alternately distributed, thereby producing the first image and the second image from each full image. In any case, it is required to transmit information for reproducing a full image from a first image and a second image together with an image.

In addition, as in the first and second embodiments, there may be employed a configuration in which a first image group and a second image group are generated every GOP (Group of Picture) instead of a configuration in which a first image group and a second image group are generated based on classification of I image, B image, and P image.

Figure 6:
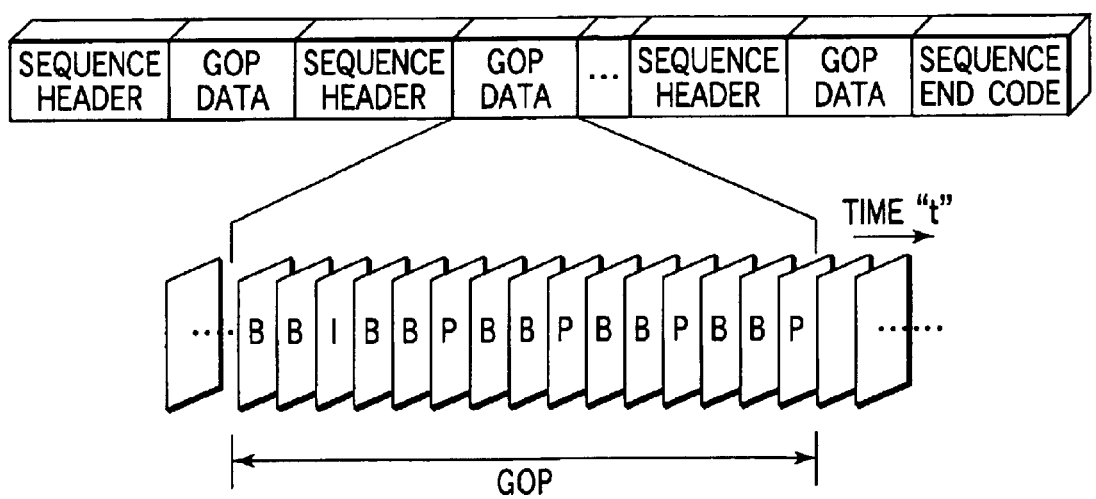
FIG. 6 is a view illustrating a modified example of the first and second embodiment.

That is, as shown in FIG. 6, for example, there may be employed a configuration in which a first image group is generated by a GOP with its odd number, and a second image group is generated by a GOP with its even number. In this case, reproduction is carried out based on a sequence header assigned to each GOP.

The present invention is not limited to the embodiments, and can be variously modified at its implementation stage without departing from the spirit of the invention. In addition, the embodiments each may be carried out in combination as required, and in this case, the combination effect can be attained. Further, the embodiments each include the invention at various stages, and a variety of inventions can be excerpted according to a proper combination of a plurality of constituent elements disclosed. For example, even if some constituent elements are erased from all the constituent elements shown in the embodiments, in the case where the problems described in the Description of Related Art section can be solved, and at least one of the advantageous effects described in the Detailed Description of the Invention section is achieved, a configuration having these constituent elements erased therefrom can be excepted as an invention.

With the above configuration, there can be provided a moving image transmission apparatus, a moving image display apparatus, a contents transmission/reproduction system, and a moving image transmission/display method free of degradation of signal in transmission from a transmission side to a receiving side, and in particular, free of degradation of an image quality of a transmission destination even in the case of a long transmission distance or in the case where transmission is carried out over plural times.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A contents transmission/reproduction system comprising:
    a contents transmission apparatus; and
    a contents reproduction apparatus for receiving and reproducing stream data,
    said contents transmission apparatus including:
        means for dividing stream data compressed in accordance with MPEG4 into a first data group, which includes at least I image data of the stream data, and a second data group, which includes residual image data of the stream data except the first data group;
        transmission means for transmitting the first data group to the contents reproduction apparatus via a communication line; and
        means for storing the second data group in a removable storage medium, said contents reproduction apparatus including:
        receiving means for receiving the first data group via the communication line;
        readout means for reading out the second data group from the storage medium; and
        reproduction means for reproducing the stream data from the received first data group and second data group read out from the storage medium.

2. A contents transmission/reproduction system comprising:
    a contents transmission apparatus; and
    a contents reproduction apparatus for receiving and displaying stream data from the contents transmission apparatus,
    said contents transmission apparatus including:
        means for compressing a data group that configures the stream data in accordance with MPEG4 scheme and for dividing the compressed data group into a first data group, which includes at least I image data of the stream data, and a second data group, which includes residual image data of the stream data except the first data group; and
        transmission means for transmitting the first data group and the second data group each at a different timing via a communication line to the contents reproduction apparatus,
    said contents reproduction apparatus including:
        receiving means for receiving the first data group and the second data group via the communication line;
        means for displaying the received first data group; and
        reproduction means for reproducing the stream data from the received first data group and the second data group.

3. The contents transmission/reproduction system according to claim 1 or 2, wherein said dividing means determines a data amount of the first data group based on a transmission capacity of the communication line.

4. A contents transmission apparatus comprising:
    dividing means for compressing a data group that configures stream data in MIPEG4 scheme and for dividing the compressed data group into a first data group, which includes at least I image data of the stream data, and a second data group, which includes residual image data of the stream data except the first data group;
    means for providing at least one of the first data group and second data group with reproduction information for reproducing the stream data by combining with another;
    transmission means for transmitting the first data group to a reproduction apparatus via a communication line; and
    means for storing the second data group in a removable storage medium.

5. A contents transmission apparatus comprising:
    dividing means for compressing a data group that configures stream data in accordance with MPEG4 scheme and for dividing the compressed data group into a first data group, which includes at least I image data of the stream data, and a second data group, which includes residual image data of the stream data except the first data group;
    means for providing at least one of the first data group and second data group with reproduction information for reproducing the stream data by combining with another; and
    transmission means for transmitting the first data group and the second data group each to a reproduction apparatus at a different timing via a communication line.

6. The contents transmission apparatus according to claim 4 or 5, wherein said dividing means determines a data amount of the first data group based on a transmission capacity of the communication line.

7. A contents reproduction apparatus comprising:
    receiving means for receiving a first data group that consists of a portion of stream data compressed in accordance with MPEG4 from a contents transmission apparatus via a communication line, the first data group including at least I image data of the stream data;
    means for acquiring a second data group, which includes residual image data of the stream data except the first data group, via a communication line from the contents transmission apparatus or a removable recording medium having the second data group recorded therein; and a reproduction means for reproducing the stream data from the first data group and the second data group.

8. The contents reproduction apparatus according to claim 7, wherein a reproduction information for reproducing the stream data is provided to at least one of the first data group and second data group in combination with another, and said reproduction means reproduces the stream data based on the reproduction information.

9. A method for transmitting/reproducing stream data compressed in accordance with MPEG4 between a customer side and a contents provider side comprising:

at the contents provider side, dividing the stream data into a first data group, which includes at least I image data of the stream data, and a second data group, which includes residual image data of the stream data except the first data group;

storing the second data group in a removable storage medium;

transmitting the first data group to the customer side via a communication line; and at the customer side, reproducing the stream data from the first data group received via the communication line and the second data group read out from the storage medium.

10. A method for transmitting/reproducing stream data compressed in accordance with MPEG4 between a customer side and a contents provider side comprising the steps of:

at the contents provider side, dividing the stream data into a first data group, which includes at least I image data of the stream data, and a second data group, which includes residual image data of the stream data except the first data group;

transmitting the first data group and the second data group to the customer side at a different timing via a communication line; and at the customer side, reproducing the stream data from the first data group and the second data group received via the communication line.

11. A contents transmission/reproduction system comprising:

a contents transmission apparatus; and a contents reproduction apparatus for receiving and reproducing voice data and image data transmitted from the contents transmission apparatus, said contents transmission apparatus including:

means for dividing image data compressed in accordance with MPE4 into a first data group, which includes at least I image data, and a second data group, which includes residual image data except the first data group;

transmission means for transmitting the voice data and the first and second data groups each to the contents reproduction apparatus at a different timing via a communication line, said contents reproduction apparatus including:

receiving means for receiving the voice data and the first and second data groups via the communication line; and reproduction means for reproducing the image data from the first and second data groups in synchronism with the received voice data.

12. A contents transmission/reproduction system comprising:

a contents transmission apparatus; and a contents reproduction apparatus for receiving and reproducing voice data and image data transmitted from the contents transmission apparatus, said contents transmission apparatus including:

means for dividing image data compressed in accordance with MPEG4 into a first data group, which includes at least I image data, and a second data group, which includes residual image data except the first data group;

transmission means for transmitting the voice data and the first data group to said contents reproduction apparatus via a communication line; and means for storing the second data group in a removable storage medium, said contents reproduction apparatus including:

receiving means for receiving the voice data and the first data group via the communication line;

readout means for reading out the second data group from the storage medium; and reproduction means for reproducing the image data from the received first data group and the readout second data group in synchronism with the received voice data.

* * * * *

UNITED STATES PATENT AND TRADEMARK OFFICE
CERTIFICATE OF CORRECTION

PATENT NO. : 6,928,489 B2
DATED : August 9, 2005
INVENTOR(S) : Togashi

It is certified that error appears in the above-identified patent and that said Letters Patent is hereby corrected as shown below:

Coulmn 12,
Line 22, change "MIPEG4" to -- MPEG4--.

Column 14,
Line 3, change "MPE4" to -- MPEG4 --.

Signed and Sealed this

Eleventh Day of October , 2005

JON W. DUDAS
*Director of the United States Patent and Trademark Office*